United States Patent
Lee et al.

(10) Patent No.: US 8,587,700 B2
(45) Date of Patent: Nov. 19, 2013

(54) METHOD OF DETECTING DEFECTS IN IMAGE SENSOR, TESTER FOR THE METHOD, AND CONTROL SIGNAL GENERATOR FOR THE METHOD

(75) Inventors: Jun-taek Lee, Hwaseong-si (KR); Byung-hyun Yim, Yongin-si (KR); Kwang-hee Lee, Anyang-si (KR); Ji-hoon Jung, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 482 days.

(21) Appl. No.: 12/589,157

(22) Filed: Oct. 19, 2009

(65) Prior Publication Data
US 2010/0097477 A1    Apr. 22, 2010

(30) Foreign Application Priority Data
Oct. 22, 2008    (KR) .................. 10-2008-0103722

(51) Int. Cl.
*H04N 9/64*    (2006.01)
*H04N 5/335*    (2011.01)

(52) U.S. Cl.
USPC .......................................... 348/246; 348/308

(58) Field of Classification Search
USPC ........ 348/246, 247, 302–308, 187; 250/208.1
See application file for complete search history.

(56) References Cited

U.S. PATENT DOCUMENTS

| | | | |
|---|---|---|---|
| 6,504,572 B2 * | 1/2003 | Kramer et al. | 348/246 |
| 2003/0146369 A1 * | 8/2003 | Kokubun | 250/208.1 |
| 2008/0186394 A1 * | 8/2008 | Panicacci | 348/308 |
| 2009/0060337 A1 * | 3/2009 | Novikov | 382/181 |
| 2009/0141145 A1 * | 6/2009 | Lee et al. | 348/230.1 |
| 2010/0020213 A1 * | 1/2010 | Mauritzson | 348/308 |

FOREIGN PATENT DOCUMENTS

| | | |
|---|---|---|
| JP | 2004-357046 A | 12/2004 |
| JP | 2005-79960 A | 3/2005 |
| JP | 2006-140666 A | 6/2006 |

* cited by examiner

*Primary Examiner* — Aung S Moe
(74) *Attorney, Agent, or Firm* — Onello & Mello, LLP

(57) ABSTRACT

A method of detecting defects in an image sensor that may occur from a floating diffusion area of the image sensor, a tester using the method, and a control signal generator using the method include a photo diode generating charges corresponding to an image signal; a transmission transistor having a first terminal connected to a the photodiode and a second terminal connected to a floating diffusion area, thereby transmitting the charges generated in the photo diode to the floating diffusion area in response to a charge transmission control signal; and a reset transistor having a first terminal applied by a reset voltage and a second transistor connected to the floating diffusion area, thereby transmitting the reset voltage to the floating diffusion area in response to a reset control signal. The reset transistor is turned on during at least one sampling zone selected between reset level sampling and signal level sampling that are performed with respect to the image sensor.

3 Claims, 3 Drawing Sheets

METHOD OF DETECTING DEFECTS IN IMAGE SENSOR, TESTER FOR THE METHOD, AND CONTROL SIGNAL GENERATOR FOR THE METHOD

CROSS-REFERENCE TO RELATED APPLICATIONS

This application claims the benefit of Korean Patent Application No. 10-2008-0103722, filed on Oct. 22, 2008, in the Korean Intellectual Property Office, the entire contents of which are incorporated herein by reference.

BACKGROUND

The inventive concept relates to an image sensor, and more particularly, to a method of detecting defects in an image sensor which may occur in a floating diffusion area of the image sensor.

Unit pixels constituting a complementary metal oxide semiconductor (CMOS) image sensor comprise a photo diode generating image charges corresponding to an image signal, a transmission transistor transmitting the image charges to a floating diffusion area, a reset transistor resetting the floating diffusion area, a conversion transistor generating a voltage signal corresponding to the image charges accumulated in the floating diffusion area, and a selection transistor outputting the voltage signal generated by the conversion transistor.

When an image signal is applied to an N-type diffusion area of a photo diode, image charges, that is, electron-hole pairs, are generated in the N-type diffusion area of the photo diode by a photoelectric effect. The generated electrons are transmitted to a floating diffusion area via a transmission transistor, and the generated holes are discharged to a ground voltage connected to a P-type diffusion area of the photo diode.

Accordingly, a width of a dynamic range of an image sensor is determined by whether all the electrons generated in the photo diode can be transmitted to the floating diffusion area, regardless of the number of the electrons. A method for increasing the width of the dynamic range is generally accomplished by a method of increasing an area of the photo diode and decreasing the width and thickness of a plurality of metal lines that are means for electrical connections.

The method of decreasing the width and thickness of the metal lines may cause defects in the image sensor due to an electrical characteristic of materials for forming the metal line. The materials for forming the metal line may be copper, aluminum, or the like. When the metal line is formed of the above materials to be slim and narrow, uniformity of the metal line may be not achieved. Also, as spacing between the metal lines decreases, an actual short caused by migration of charges between adjacent metal lines may occur.

An image sensor includes a plurality of unit pixels arranged in a two-dimensional array. When the defects described above occur in a unit pixel from among the plurality of unit pixels, the unit pixel is brighter or darker than unit pixels not having a defect as described above. The defects described above may also be represented as a vertical or horizontal line.

Since the unit pixels having the defects described above operate normally, a general examination with respect to an image sensor cannot detect the defects described above. Also, the defects described above cannot be easily distinguished from defects that occur on a photo diode constituting an image sensor when foreign materials, such as dust, or the like, cut off an image signal applied to the photo diode.

The above defects, which may occur due to leakage current between a floating diffusion area and a substrate, can be detected, but when performing a reliability examination on a completed product, manufacturing costs of image sensors are increased.

SUMMARY

The inventive concept provides a method of detecting defects in an image sensor, which detects defects that occur due to leakage current between a floating diffusion area of a unit pixel and a substrate that constitute the image sensor, and due to a short between the floating diffusion area and an adjacent metal line.

The inventive concept also provides a tester which detects defects that occur due to leakage current between a floating diffusion area of a unit pixel and a substrate which constitute the image sensor, and due to a short between the floating diffusion area and an adjacent metal line.

The inventive concept also provides a control signal generator which generates a control signal used to detect defects that occur due to leakage current between a floating diffusion area of a unit pixel and a substrate which constitute the image sensor, and due to a short between the floating diffusion area and an adjacent metal line.

According to an aspect of the inventive concept, there is provided a method of detecting defects in an image sensor. The image sensor includes a photo diode generating charges corresponding to an image signal; a transmission transistor having a first terminal connected to the photodiode and a second terminal connected to a floating diffusion area, thereby transmitting the charges generated in the photo diode to the floating diffusion area in response to a charge transmission control signal; and a reset transistor having a first terminal connected to a reset voltage and a second terminal connected to the floating diffusion area, thereby transmitting the reset voltage to the floating diffusion area in response to a reset control signal. The method includes turning on the reset transistor during at least one sampling zone of one of reset level sampling and signal level sampling that are performed on the image sensor.

In one embodiment, the method includes applying a clamping voltage to the floating diffusion area during the reset level sampling zone. In one embodiment, a voltage level of the clamping voltage is variable.

In one embodiment, the reset transistor is turned on during the reset level sampling zone, and the reset transistor is turned off during the signal level sampling zone.

According to another aspect of the inventive concept, there is provided a tester for testing electrical characteristics of an image sensor by performing reset level sampling and signal level sampling on the image sensor. The image sensor includes a photo diode, a transmission transistor, and a reset transistor. The reset transistor is turned on during a reset level sampling zone and a signal level sampling zone, or the reset transistor is turned on during the reset level sampling zone and the reset transistor is turned off during the signal level sampling zone.

In one embodiment, when the reset transistor is turned on during the reset level sampling zone and the signal level sampling zone, a clamping voltage is further applied to the floating diffusion area during the reset level sampling zone.

According to another aspect of the inventive concept, there is provided a control signal generator used to examine electrical characteristics of an image sensor by performing reset level sampling and signal level sampling on the image sensor. The image sensor includes a photo diode, a transmission transistor, and a reset transistor. The control signal generator generates a reset control signal to turn on the reset transistor during a reset level sampling zone and the signal level sampling zone, or to turn on the reset transistor during the reset level sampling zone and turn off the reset transistor during the signal level sampling zone, and the reset control signal is applied to a gate terminal of the reset transistor.

BRIEF DESCRIPTION OF THE DRAWINGS

The foregoing and other features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings, the thickness of layers and regions are exaggerated for clarity.

DETAILED DESCRIPTION OF THE EMBODIMENTS

Figure 1:
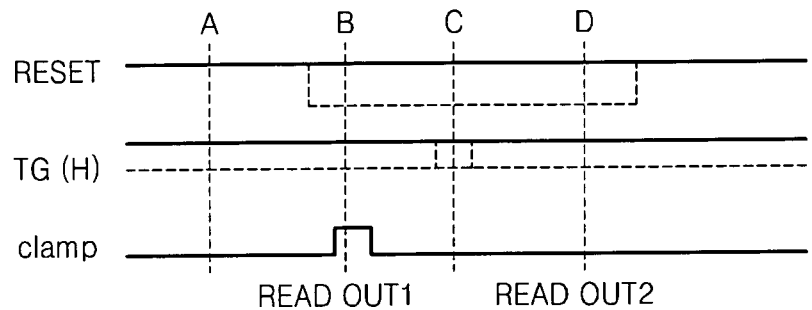
FIG. 1 is a waveform diagram of control signals used to detect defects in an image sensor, according to an embodiment of the inventive concept.

FIG. 1 is a waveform diagram of control signals used to detect defects in an image sensor, according to an embodiment of the inventive concept.

Referring to FIG. 1, both a reset control signal (RESET) and a charge transmission control signal (TG) have values of logic high, and a clamping signal (CLAMP) has a value of logic low in three zones A, C, and D of four zones of A, B, C, and D. The reset control signal RESET, the charge transmission control signal TG, and the clamping signal CLAMP all have a value of logic high in the B zone.

The reset control signal RESET is applied to a gate terminal of a reset transistor, the charge transmission control signal TG is applied to a transmission transistor, and the clamping signal CLAMP is applied to a floating diffusion area to directly transmit a constant voltage to the floating diffusion area.

In FIG. 1, since the four zones A, B, C, and D are marked by vertical dotted lines, the four zones may be referred to as points of time. However, hereinafter, a predetermined range of time around the vertical dotted lines will be defined as a time zone. For example, a predetermined range of a time zone centered about the dotted line representing the instant A is referred to as an A zone or an A time zone.

Referring to FIG. 1, the reset control signal RESET and the charge transmission control signal TG, both constantly maintaining a logic high state during the B zone, i.e., a reset level sampling (read out1) zone, and the D zone, i.e., a signal level sampling (read out2) zone, are applied to a gate of a reset transistor and a gate of a transmission transistor, respectively. The clamping signal CLAMP, having a value of logic high only during the reset level sampling (read out1) zone, is applied to the floating diffusion area. In general, a voltage level of the clamping signal CLAMP may be the same as those of the reset control signal RESET and the charge transmission control signal TG, but the voltage level of the clamping signal CLAMP may be variable.

When a unit pixel operates normally, the unit pixel is reset during the A zone, the reset level sampling (read out1) is performed during the B zone, and the signal level sampling (read out2) is performed during the D zone. The transmission transistor is turned on during the C zone when the unit pixel operates normally, but the C zone has a function of distinguishing the reset level sampling (read out1) zone from the signal level sampling (read out2) zone when used in a method of detecting defects in an image sensor according to the inventive concept.

The dotted line illustrated in FIG. 1 illustrates a waveform of a signal when the unit pixel operates normally.

A voltage signal corresponding to the image charges detected by the unit pixel is determined by differences between a voltage level of a conversion signal that originates from reset charges of the floating diffusion area that is reset by the reset voltage in the reset level sampling (read out 1) zone and a voltage level of a conversion signal that originates from the image signal detected in the signal level sampling (read out2) zone. That is, a high supply voltage $V_D$ is applied to the floating diffusion area via the reset transistor in the reset level sampling (read out1) zone, then a voltage signal $V_1$ corresponding to the supply voltage $V_D$ is obtained, and a voltage signal $V_2$ corresponding to image charges transmitted via the charge transmission transistor is obtained in the signal level sampling (read out2) zone. Here, the conversion signal denotes a signal that is output through a selection transistor from a unit pixel.

Thus, the difference between two voltage signals obtained during one cycle, that is, across the four time zones A, B, C, and D, becomes a voltage signal corresponding to an image signal that is incident on a photodiode. The reset transistor is turned off in the signal level sampling (read out2) zone.

Operation of an image sensor is well-known, and thus a detailed description thereof is not provided.

Referring to waveforms having solid lines illustrated in FIG. 1, the waveform of the charge transmission control signal TG and the reset control signal RESET used in the method of detecting defects in the CMOS image sensor according to the inventive concept is different from the waveforms of the signals used when the unit pixel operates normally, wherein the waveform of the signals used when the unit pixel operates normally is illustrated as a dotted line.

Hereinafter, in order to provide a more clear understanding of the meanings of the waveforms of the control signals illustrated in FIG. 1, potential barriers between elements constituting a unit pixel and charges moving between the potential barriers will be described.

Figure 2:
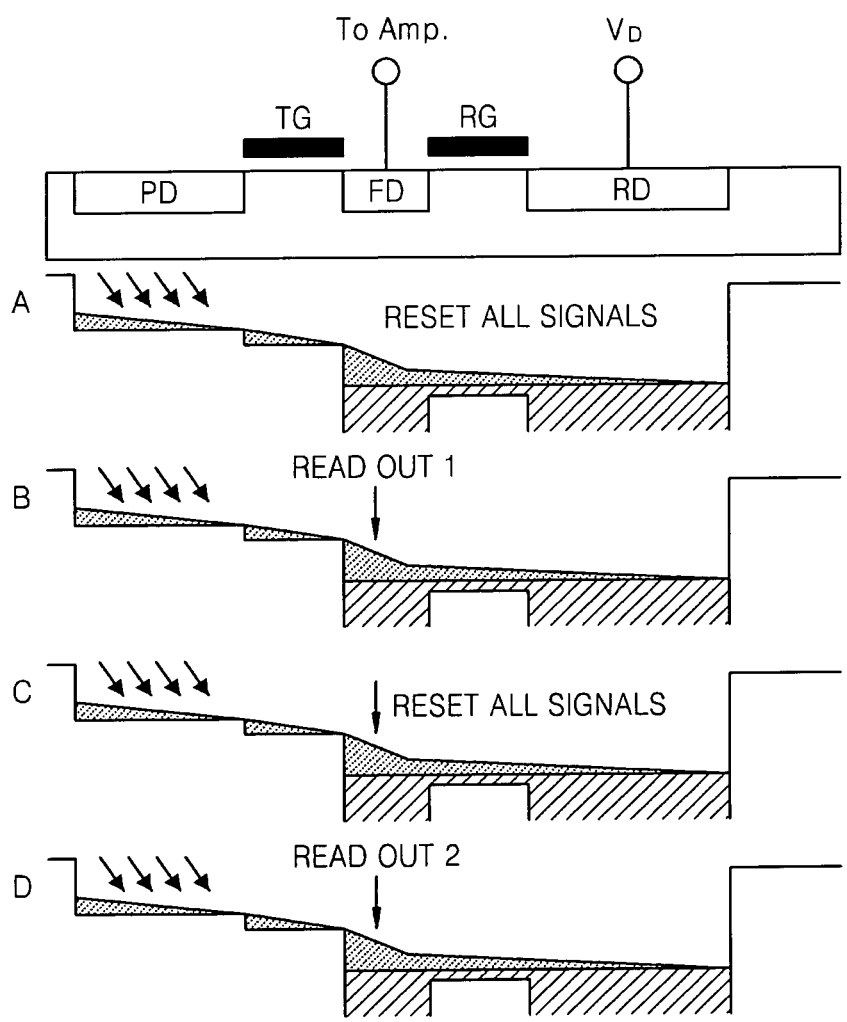
FIG. 2 illustrates variation of potential barriers between elements constituting a unit pixel, to which each of the control signals illustrated in FIG. 1 is applied, and charges moving between the potential barriers.

FIG. 2 illustrates variations of the potential barriers between the elements constituting the unit pixel, to which each of the control signals illustrated in FIG. 1 is applied, and the charges moving between the potential barriers.

First, the elements of the unit pixel illustrated as a vertical cross-sectional view in FIG. 2 will be described.

Here, a first terminal of a transmission transistor is connected to a photo diode PD, a second terminal of the transmission transistor is connected to a floating diffusion area FD, and a gate of the transmission transistor is applied by a charge transmission control signal TG (not shown). A first terminal of a reset transistor is connected to a diffusion area RD to which a reset voltage $V_D$ is applied, a second terminal of the reset transistor is connected to the floating diffusion area FD, and a gate of the reset transistor is applied by a reset control signal RESET. The floating diffusion area FD is applied by a clamping signal CLAMP. The floating diffusion area FD is generally connected to a gate of a conversion transistor.

FIG. 2 illustrates that the charge transmission control signal TG is applied to the gate of the transmission transistor, and hereinafter, the charge transmission control signal TG will also be used as an alternative name of the transmission transistor, and an RG will be used as an alternative name of the reset transistor.

Referring to FIG. 2, in the A zone, since the transmission transistor TG is on, charges (marked by a plurality of dots) generated in the photo diode PD are transmitted to the floating diffusion area FD. However, since the reset transistor RG is also on, the floating diffusion area FD is reset to a supply voltage $V_D$ (marked by oblique lines), thereby resetting the floating diffusion area FD. At this time, the clamping signal CLAMP does not affect the voltage level of the floating diffusion area FD. Image charges generated in the photo diode PD are transmitted to the floating diffusion area FD via the transmission transistor TG, and the reset voltage $V_D$ continuously resets the floating diffusion area FD. Accordingly, image charges are not accumulated in the floating diffusion area FD.

The B zone is the same as the A zone, except for the fact that a clamping voltage (that is, a voltage of the clamping signal CLAMP) is applied to the floating diffusion area FD. The floating diffusion area FD may be reset more clearly by applying the clamping voltage to the floating diffusion area FD. In the B zone, a reset conversion voltage $V_1$ is obtained by performing reset level sampling (read out1).

Both the C zone and the D zone have the same signal condition as the A zone, and thus description thereof will not be repeated. In the D zone, a signal conversion voltage $V_2$ is obtained by performing signal level sampling (read out2).

Thus, a difference voltage ($V_{DIFF}=V_1-V_2$) between a reset conversion voltage $V_1$ converted in the reset level sampling (read out1) zone and a signal conversion voltage $V_2$ converted in the signal level sampling (read out2) zone may be obtained. If the unit pixel operates normally, the difference voltage $V_{DIFF}$ will be 0, but when defects are present and affect operation, for example, a leakage current between the floating diffusion area FD and a substrate, the difference voltage $V_{DIFF}$ will not be 0.

Since the unit pixel in which the difference voltage $V_{DIFF}$ is not 0 is defective, an image sensor in which corresponding unit pixels are accumulated must not be produced.

Figure 3:
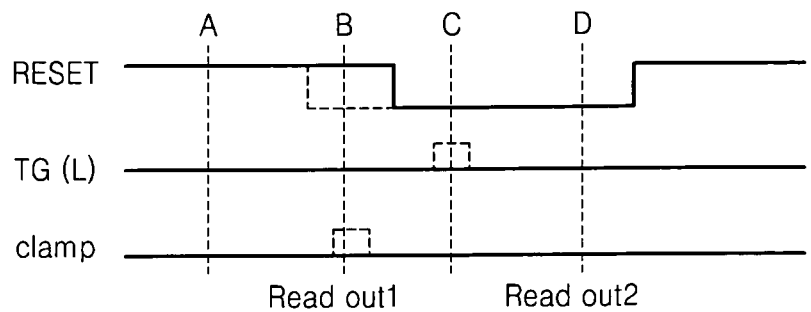
FIG. 3 is a waveform diagram of control signals used to detect defects in an image sensor, according to another embodiment of the inventive concept.

FIG. 3 is a waveform diagram used to detect defects in an image sensor, according to another embodiment of the inventive concept.

In the waveform diagram illustrated in FIG. 3, the reset control signal RESET has a value of logic high in the A and B zones, but has a value of logic low in the C and D zones. The charge transmission control signal TG and the clamping signal CLAMP have values of logic low in the all zones.

Hereinafter, in order to more clearly understand the meanings of the waveforms of the control signals illustrated in FIG. 3, each potential barrier between elements constituting a unit pixel and charges moving between the potential barriers will be described.

Figure 4:
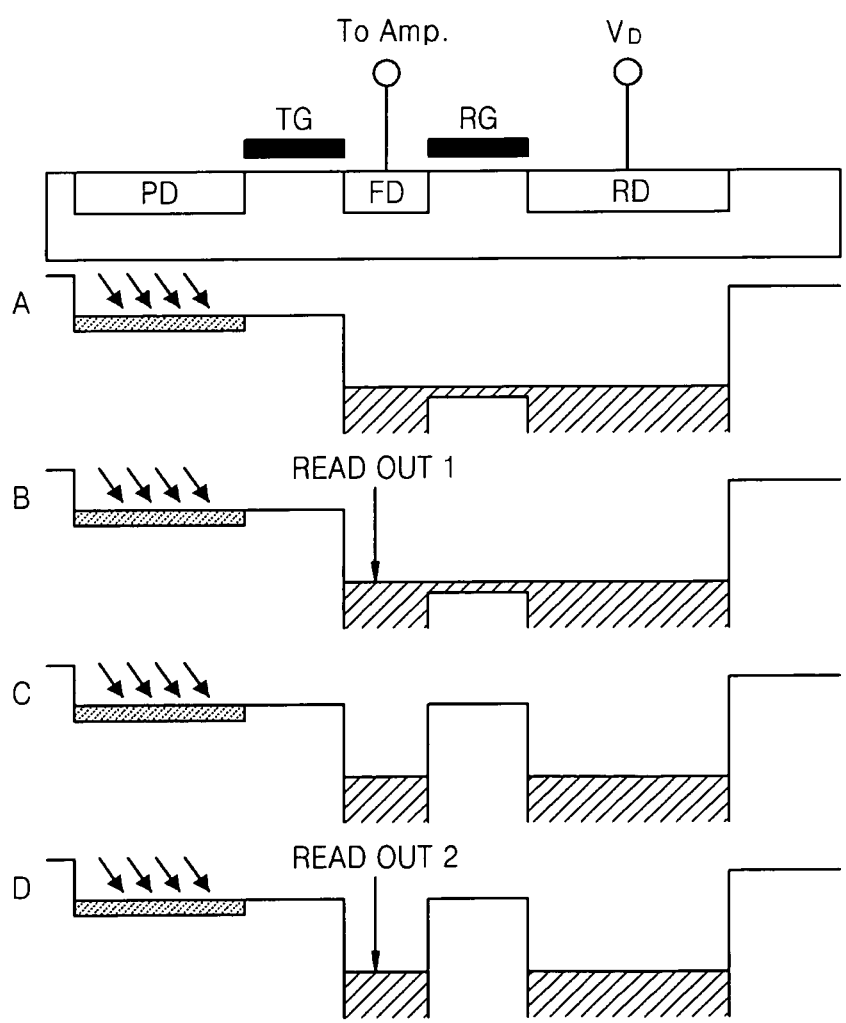
FIG. 4 illustrates variation of potential barriers between elements constituting a unit pixel, to which each of the control signals illustrated in FIG. 3 is applied, and charges moving between the potential barriers.

FIG. 4 illustrates variations of potential barriers between elements constituting a unit pixel, to which each of the control signals illustrated in FIG. 3 is applied, and charges moving between the potential barriers.

Referring to FIG. 4, in an A zone, a reset transistor RG is on, but a transmission transistor TG is off. Accordingly, a high potential barrier exists between a floating diffusion area FD and a photo diode PD area, thus image charges generated in the photo diode PD (marked by a plurality of dots) cannot be transmitted to the floating diffusion area FD. Also, the floating diffusion area FD is reset to a reset voltage $V_D$ applied via the reset transistor RG (marked by oblique lines).

In the B zone, a reset conversion voltage $V_1$ is measured. The form of the signal is the same as the A zone, and thus a detailed description thereof will not be repeated.

C and D zones are different from the A and B zones in that a reset control signal RESET is converted to a logic low state. In the C and D zones, since the reset transistor RG is turned off, a high potential barrier exists between a first terminal (RD) of the reset transistor RG supplying a reset voltage $V_D$ and a second terminal connected to the floating diffusion area FD, thus movement of the charges therebetween is cut off. In the D zone, a signal conversion voltage $V_2$ is measured.

Similarly to the reason described with reference to FIG. 2, in the case of a unit pixel manufactured normally, a difference voltage $V_{DIFF}$ between the reset conversion voltage $V_1$ converted in the reset level sampling (read out1) zone and the signal conversion voltage $V_2$ converted in the signal level sampling (read out2) zone will be 0. However, when defects, for example, a leakage current between the floating diffusion area FD and a substrate, are present and affect operation, the difference voltage $V_{DIFF}$ will not be 0.

As described above, defects that cannot be found during a test while normally operating the unit pixel may be easily detected by generating and using the control signal illustrated in FIGS. 1 and 3.

Figure 5:
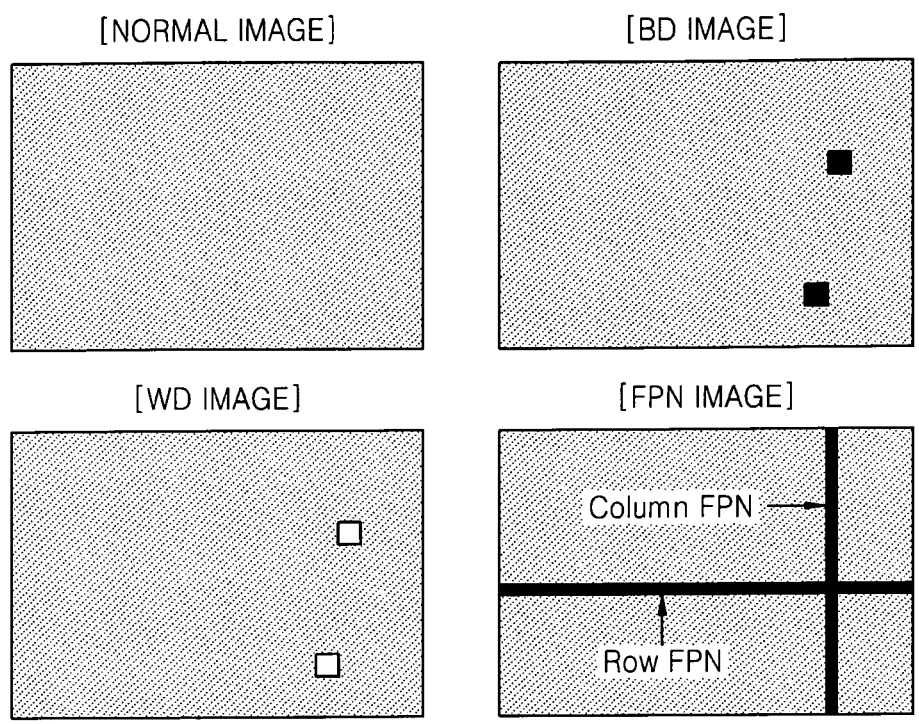
FIG. 5 illustrates examples of a normal image sensor and image sensors having various types of defects.

FIG. 5 illustrates examples of a normal image sensor and image sensors having various types of defects.

FIG. 5 illustrates four cases. The upper left figure illustrates a normal image sensor, the upper right figure illustrates a case where black defects (BD) are marked on a part of an area comprised of unit pixels of an image sensor, the lower left figure illustrates a case where white defects (WD) are marked on a part of an area comprised of unit pixels of an image sensor, and the lower right figure illustrates a case where a defect having the form of vertical and horizontal lines (Fixed Pattern Noise; FPN) is generated.

According to a method of detecting defects in an image sensor according to the inventive concept, defects that cannot be found during a test while operating the unit pixel normally may be readily detected.

While the inventive concept has been particularly shown and described with reference to exemplary embodiments thereof, it will be understood that various changes in form and details may be made therein without departing from the spirit and scope of the following claims.

What is claimed is:

1. A method of detecting defects in an image sensor which includes a photo diode generating charges corresponding to an image signal; a transmission transistor having a first terminal connected to the photodiode and a second terminal connected to a floating diffusion area, thereby transmitting the charges generated in the photo diode to the floating diffusion area in response to a charge transmission control signal; and a reset transistor having a first terminal connected to a reset voltage and a second terminal connected to the floating diffusion area, thereby transmitting the reset voltage to the floating diffusion area in response to a reset control signal, the method comprising:

turning on the reset transistor, performing a reset level sampling on the image sensor during a reset level sampling zone, applying the reset voltage to the reset transistor during the reset level sampling zone and applying a clamping voltage to the floating diffusion area during the reset level sampling zone;

performing a signal level sampling on the image sensor during a signal level sampling zone; and detecting whether there is a difference between the sampled reset level and the sampled signal level.

2. The method of claim 1, wherein a voltage level of the clamping voltage is variable.

3. A tester for testing electrical characteristics of an image sensor by performing reset level sampling and signal level sampling on the image sensor, the image sensor including a photo diode, a transmission transistor, and a reset transistor, wherein the reset transistor is turned on during a reset level sampling zone and a signal level sampling zone, or the reset transistor is turned on during the reset level sampling zone and the reset transistor is turned off during the signal level sampling zone and wherein the tester is arranged and configured to detect whether there is a difference between the sampled reset level and the sampled signal level, wherein when the reset transistor is turned on during the reset level sampling zone and the signal level sampling zone, a reset voltage is applied to the reset transistor during the reset level sampling zone and a clamping voltage is further applied to the floating diffusion area during the reset level sampling zone.

* * * * *